L. S. CHICHESTER.
Coffee Mill.

No. 30,298.

Patented Oct. 9, 1860.

Witnesses

Inventor
Lewis S. Chichester

UNITED STATES PATENT OFFICE.

LEWIS S. CHICHESTER, OF NEW YORK, N. Y.

MILL FOR GRINDING COFFEE.

Specification of Letters Patent No. 30,298, dated October 9, 1860.

*To all whom it may concern:*

Be it known that I, LEWIS S. CHICHESTER, of the city and State of New York, have invented, made, and applied to use a certain new and useful Improvement in Mills for Grinding Coffee, &c.; and I do hereby declare that the following is a full, clear, and exact description of the construction and operation of the same, reference being had to the annexed drawing, making a part of this specification, wherein—

Figure 1:
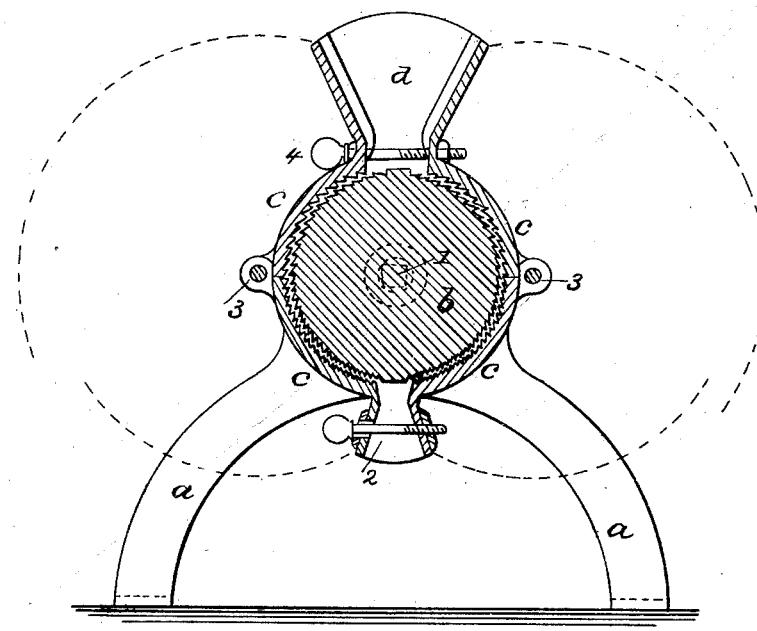
Figure 2:
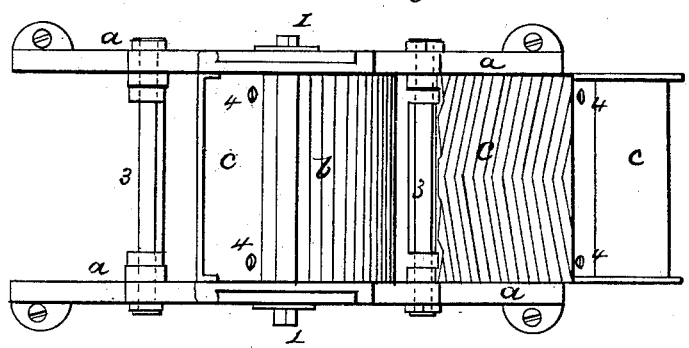

Figure 1, is a vertical section of my mill, and Fig. 2, is a plan of the same with one of the cheek pieces laid down horizontally.

Similar marks of reference denote the same parts.

My said invention consists in an oscillating grooved cylinder combined with adjustable cheek pieces that are grooved on their inner faces with inclined furrows, and the cutting edges of the grooves on the cylinder standing in the reverse direction to those on cheek pieces and at an angle to the same produces a shearing cut that is specially adapted to cutting or cracking up the grains of coffee into fine particles, without the compressing and rubbing operation so usual in mills, which tends to disperse the essential oil of the coffee and thereby impair its flavor.

In the drawing $a$, $a$, are side pieces forming the legs or frame and also receiving the axles 1, 1, of the cylinder or nut $b$. This cylinder is to receive an oscillating motion by means of a crank or handle attached to a square formed on one of the journals (1, 1.) The cylinder $b$, is grooved longitudinally as shown, those on the upper side being coarse and those on the under part finer according to the material to be operated on.

The cheek pieces $c$, $c$, are made concave, upon a curvature corresponding to the cylinder $b$; and according to the proximity of these cheek pieces to the cylinder $b$, on the lower side, so the material will be ground coarser or finer; 2, is an adjusting screw to regulate said cheek pieces at this point: I have represented these cheek pieces as divided in the center, as being more convenient for casting, and the same are attached by the cross bolts 3, 3, passing through lugs on the respective pieces, and 4, 4, are screws by which the upper cheeks are adjusted. The faces of these cheeks $c$ are formed with the converging grooves as represented in Fig. 1, and the grooves are made smaller as they approach the bottom.

The hopper $d$, for the coffee or other material to be ground is formed by the upper parts of the sides $a$, $a$, and cheeks $c$, $c$.

The operation of my mill will be apparent from the foregoing; for the grains are carried in between the cylinder $b$, and cheeks $c$, by the oscillation of the former and the cutting edges formed by the grooves in the respective parts crack and cut the grains until reduced to the required fineness; and the grooves in the cheeks $c$, being diagonal and converging as shown not only tend to cut better with a shearing motion, but also gather the grains toward the center tending to prevent any clogging between the cylinder $b$, and sides $a$.

I do not claim an oscillating or vibrating cylinder in itself, but

What I claim, and desire to secure by Letters Patent, is—

The adjustable cheek pieces $c$, $c$, formed with converging grooves in combination with the oscillating or vibrating cylinder $b$, as and for the purposes specified.

In witness whereof I have hereunto set my signature this thirty first day of August, 1860.

LEWIS S. CHICHESTER.

Witnesses:
LEMUEL W. SERRELL,
CHAS. H. SMITH.